(12) United States Patent
Anderson et al.

(10) Patent No.: US 7,280,349 B2
(45) Date of Patent: Oct. 9, 2007

(54) METHOD AND APPARATUS FOR CUSTOMIZING A CHASSIS

(75) Inventors: Mark Anderson, Austin, TX (US);
Daniel Chappelear, Austin, TX (US);
Henry Gudenau, Jarrell, TX (US)

(73) Assignee: Dell Products L.P., Round Rock, TX (US)

( * ) Notice: Subject to any disclaimer, the term of this patent is extended or adjusted under 35 U.S.C. 154(b) by 36 days.

(21) Appl. No.: 11/176,778

(22) Filed: Jul. 7, 2005

(65) Prior Publication Data

US 2007/0008684 A1    Jan. 11, 2007

(51) Int. Cl.
*G06F 1/16* (2006.01)
(52) U.S. Cl. ............... 361/681; 312/216; 206/457
(58) Field of Classification Search ........... 312/204, 312/216, 218; 361/679–687, 724–727; 40/491, 40/725; 206/457
See application file for complete search history.

(56) References Cited

U.S. PATENT DOCUMENTS

| 6,437,976 | B1* | 8/2002 | Wolff et al. ............ 361/683 |
| 6,520,607 | B2* | 2/2003 | Pfaff ..................... 312/204 |
| 2005/0212686 | A1* | 9/2005 | Lee ..................... 340/825.72 |
| 2006/0086019 | A1* | 4/2006 | Wilcoxen et al. ......... 40/491 |
| 2006/0098397 | A1* | 5/2006 | Chou .................... 361/680 |

* cited by examiner

*Primary Examiner*—Hung Van Duong
(74) *Attorney, Agent, or Firm*—Haynes and Boone, LLP (57) ABSTRACT

A chassis customizing apparatus for coupling to an information handling system chassis includes a chassis cover having a chassis coupling member and means for displaying an image with the chassis cover. In an embodiment, the chassis cover is fabricated from a transparent material, and the means for displaying an image with the chassis cover includes positioning an image between an information handling system chassis and the chassis cover which is visible through the chassis cover.

17 Claims, 7 Drawing Sheets

METHOD AND APPARATUS FOR CUSTOMIZING A CHASSIS

BACKGROUND

The present disclosure relates generally to information handling systems, and more particularly to a method and apparatus for customizing the chassis of an information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically include a chassis which protects the components of the information handling system from damage. Conventional information handling system chassis are subject to scratches, which degrade the appearance of the information handling system chassis. Furthermore, a conventional information handling system chassis is generally mass-produced and is substantially similar to co-produced information handling systems chassis. A problem arises when users desire an information handling system with a chassis that does not look substantially similar to other information handling systems chassis. If information handling system manufacturers attempt to produce a larger variety of information handling systems chassis, costs increase substantially.

Accordingly, it would be desirable to provide a method and apparatus for customizing a chassis absent the disadvantages found in the prior methods discussed above.

SUMMARY

According to one embodiment, a chassis customizing apparatus for coupling to an information handling system chassis includes a chassis cover having a chassis coupling member and means for displaying an image with the chassis cover.

BRIEF DESCRIPTION OF THE DRAWINGS

FIG. 2b is a bottom perspective view illustrating an embodiment of the chassis cover of FIG. 2a.

FIG. 3a is a front perspective view illustrating an embodiment of an information handling system chassis used with the chassis cover illustrated in FIG. 2a.

FIG. 3b is a rear perspective view illustrating an embodiment of the information handling system chassis of FIG. 3a.

FIG. 4b is a perspective view illustrating an embodiment of the chassis cover of FIG. 2a coupled to the information handling system chassis of FIG. 3a.

FIG. 7d is a perspective view illustrating an embodiment of the chassis cover and image medium of FIG. 7c coupled to the information handling system chassis of FIG. 3a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
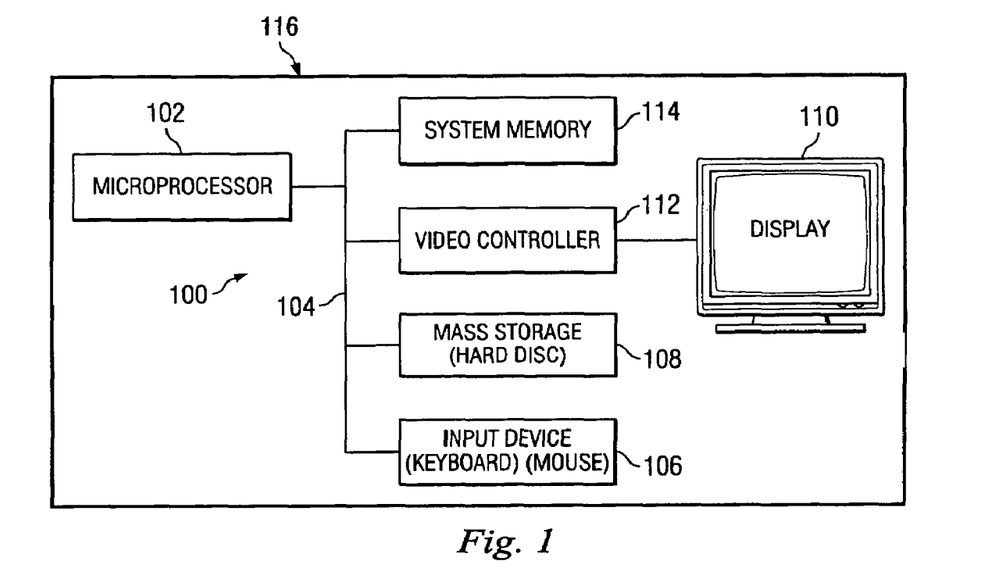
FIG. 1 is a schematic view illustrating an embodiment of an information handling system.

In one embodiment, information handling system 100, FIG. 1, includes a microprocessor 102, which is connected to a bus 104. Bus 104 serves as a connection between microprocessor 102 and other components of computer system 100. An input device 106 is coupled to microprocessor 102 to provide input to microprocessor 102. Examples of input devices include keyboards, touchscreens, and pointing devices such as mouses, trackballs and trackpads. Programs and data are stored on a mass storage device 108, which is coupled to microprocessor 102. Mass storage devices include such devices as hard disks, optical disks, magneto-optical drives, floppy drives and the like. Information handling system 100 further includes a display 110, which is coupled to microprocessor 102 by a video controller 112. A system memory 114 is coupled to microprocessor 102 to provide the microprocessor with fast storage to facilitate execution of computer programs by microprocessor 102. In an embodiment, a chassis 116 houses some or all of the components of information handling system 100. It should be understood that other busses and intermediate circuits can be deployed between the components described above and microprocessor 102 to facilitate interconnection between the components and the microprocessor.

Figure 2A:
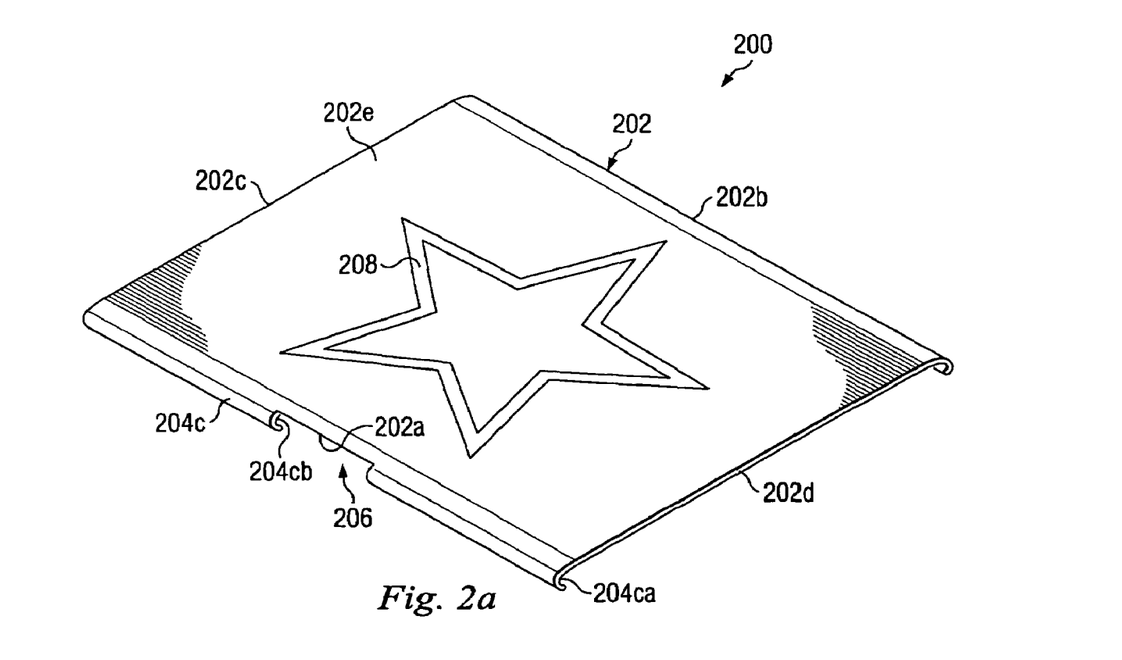
FIG. 2a is a top perspective view illustrating an embodiment of a chassis cover.
Figure 2B:
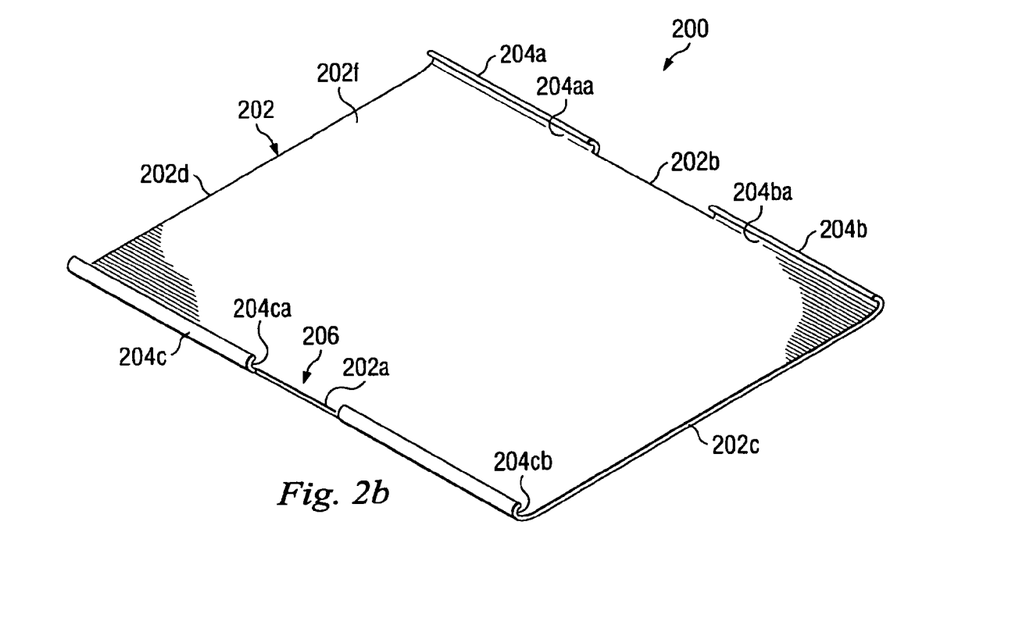

Referring now to FIGS. 2a and 2b, a chassis cover 200 is illustrated. The chassis cover 200 includes a base 202 having a front edge 202a; a rear edge 202b located opposite the front edge 202a; a pair of substantially parallel and spaced apart opposing side edges 202c and 202d extending between the front edge 202a and the rear edge 202b; a top surface 202e extending between the front edge 202a, the rear edge 202b, and the side edges 202c and 220d; and a bottom surface 202f located opposite the top surface 202e and extending between the front edge 202a, the rear edge 202b, and the side edges 202c and 220d. In an embodiment, the base 202 is fabricated from a plastic material. In an embodiment, the base 202 fabricated from a material which is 1/32 of an inch thick. A pair of chassis coupling members 204a and 204b extend from the bottom surface 202f and the rear edge 202b of the base 202, with each chassis coupling member 204a and 204b having an arcuate cross section with distal ends 204aa and 204ba, respectively. A chassis coupling member 204c extends from the bottom surface 202f and the front edge 202a; has an arcuate cross section with distal ends 204ca and 204cb, respectively; and defines a channel 206 that is substantially centrally located on the chassis coupling member 204c and which separates distal ends 204ca and 204cb. An image 208 is displayed on the top surface 202e of the base 202. In an embodiment, the image 208 is printed on the top surface 202e of the base 202 using conventional methods known in the art. In an embodiment, the image 208 is coupled to the top surface 202e of the base 202 using convention methods known in the art such as, for example, adhesives or ink. In an embodiment, the image 208 may include a photograph, a printed image and/or text from a convention printer, and/or a variety of other images known in the art.

Figure 3A:
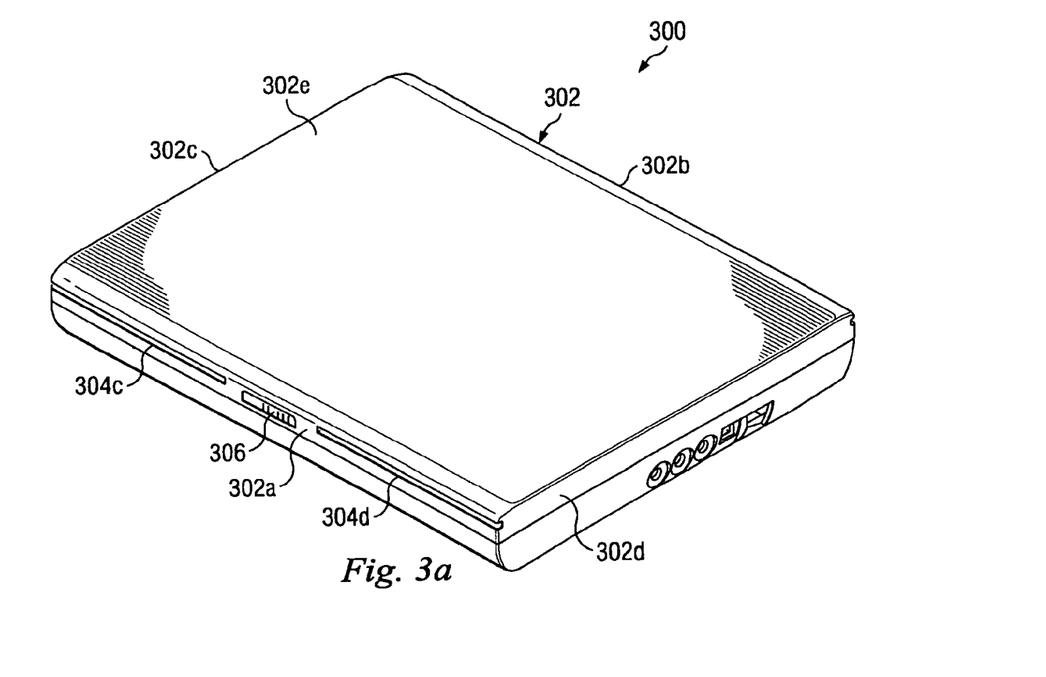
Figure 3B:
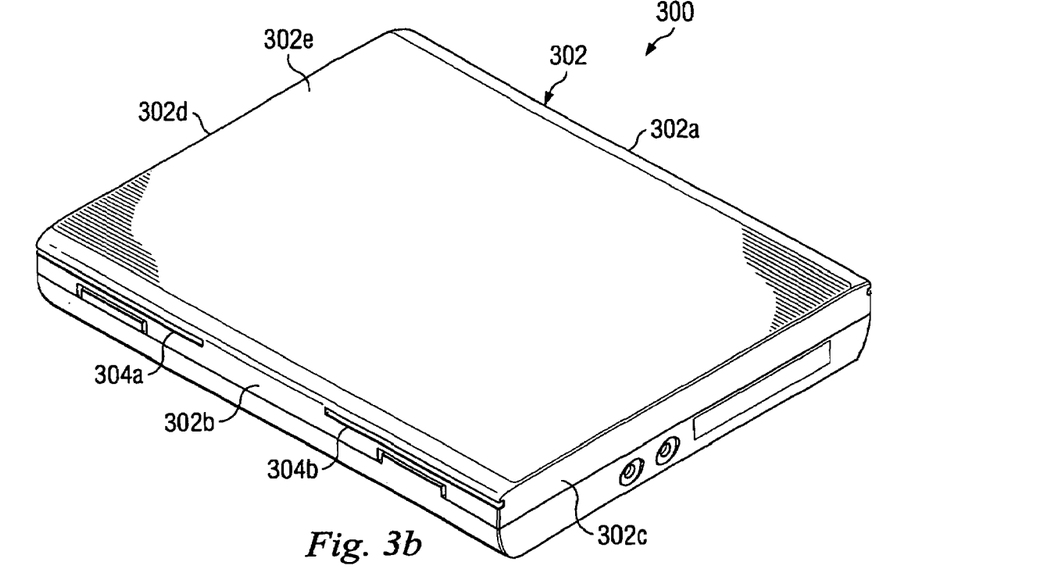

Referring now to FIGS. 3a and 3b, an information handling system chassis 300 is illustrated. In an embodiment, the information handling system chassis 300 may be the chassis 116 described above with reference to FIG. 1. In an embodiment, the information handling system chassis 116 may house some or all of the components of the information handling system 100 described above with reference to FIG. 1. The information handling system chassis 300 includes a base 302 having a front edge 302a; a rear edge 302b located opposite the front edge 302a; a plurality of substantially parallel and spaced apart opposing side edges 302c and 302d which extend between the front edge 302a and the rear edge 302b; and a top outer surface 302e which extends between the front edge 302a, the rear edge 302b, and the side edges 302c and 302d. A pair of cover coupling members 304a and 304b are located on the rear edge 302b in a spaced apart relationship and, in an embodiment, includes a pair of grooves defined by the base 302. A pair of cover coupling members 304c and 304d are located on the front edge 302a in a spaced apart relationship and, in an embodiment, includes a pair of grooves defined by the base 302. A chassis feature 306 is centrally located on the front edge 302a and between the cover coupling member 304c and 304d. In an embodiment, the chassis feature 306 may include a release latch, a power button, or a variety of other chassis features known in the art. In an embodiment, the information handling system chassis 300 may be a portable computer chassis. In an embodiment, the information handling system chassis 300 may be a desktop computer chassis.

Referring now to FIGS. 2b, 3a, 3b, 4a and 4b, a method 400 for customizing a chassis is illustrated. The method 400 begins at step 402 where the chassis cover 200 is provided. The method 400 then proceeds to step 404 where the chassis cover 200 is coupled to the information handling system chassis 300.

Figure 4A:
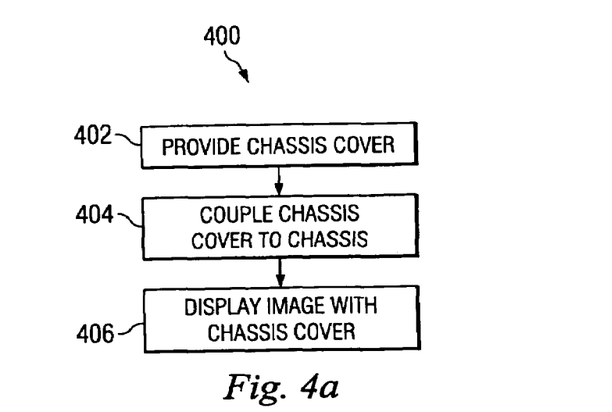
FIG. 4a is a flow chart illustrating an embodiment of a method for customizing a chassis.
Figure 4B:
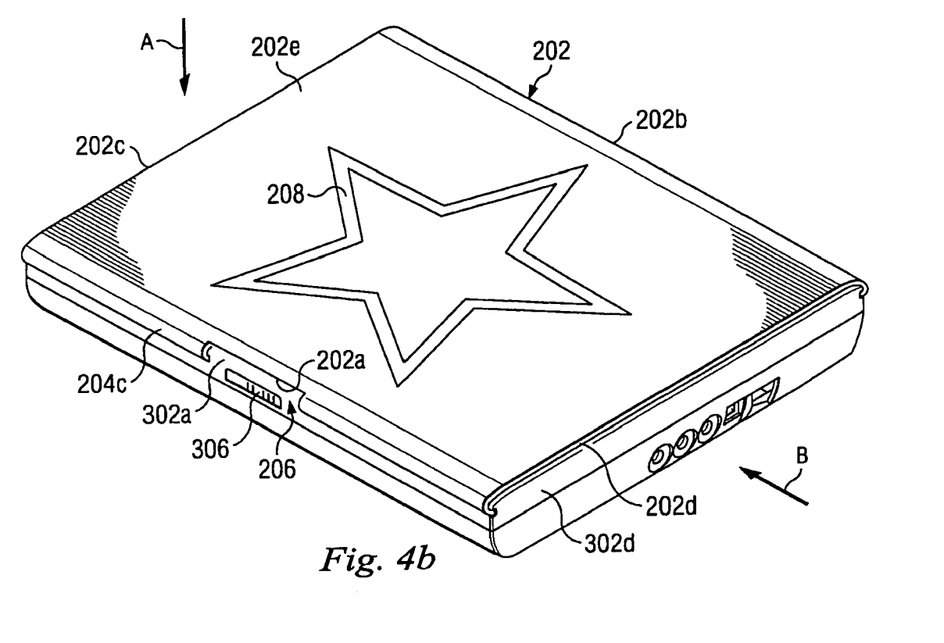

In an embodiment, the chassis cover 200 may be coupled to the information handling system chassis 300 by first positioning the chassis cover 200 adjacent the information handling system chassis 300 such that the bottom surface 202f of the chassis cover 200 is adjacent the top outer surface 302e of the information handling system chassis 300. The chassis cover is then moved in a direction A such that the chassis coupling members 204a and 204b engage the top surface 302e and the rear edge 302b of the information handling system chassis 300; and the chassis coupling member 204c engages the top surface 302e and the front edge 302a of the information handling system chassis 300. Engagement of the chassis coupling members 204a, 204b, and 204c with the information handling system chassis 300 causes the chassis coupling members 204a, 204b, and 204c to deflect until the distal end 204aa of chassis coupling member 204a engages the cover coupling member 304a; the distal end 204ba of chassis coupling member 204b engages the cover coupling member 304b; and the distal ends 204ca and 204cb of chassis coupling member 204c engage the cover coupling members 304c and 304d, respectively. With the chassis coupling members 204a, 204b, and 204c engaging the cover coupling members 304a, 304b, and 304c and 304d, respectively, the chassis cover 200 is coupled to the information handling system chassis 300, as illustrated in FIG. 4b, with the chassis feature 306 located adjacent the channel 206 in chassis cover 200.

In an alternative embodiment, the chassis cover 200 may be coupled to the information handling system chassis 300 by first positioning the chassis cover 200 adjacent the information handling system chassis 300 such that the side edge 202c of the chassis cover 200 is adjacent the side edge 302d of the information handling system chassis 300. The chassis cover is then moved in a direction B such that the edges of the distal ends 204ba and 204cb on chassis coupling members 204b and 204c, respectively, which are adjacent side edge 202c on chassis cover 200, engage the edges of cover coupling members 304d and 304a, respectively, adjacent the side edge 302d on the information handling system chassis 300. Continued movement of the chassis cover in direction B results in the engagement of the chassis coupling members 204a, 204b, and 204c with the cover coupling members 304a, 304b, and 304c and 304d, respectively, with the distal end 204aa of chassis coupling member 204a engaging the cover coupling member 304a; the distal end 204ba of chassis coupling member 204b engaging the cover coupling member 304b; and the distal ends 204ca and 204cb of chassis coupling member 204c engaging the cover coupling members 304c and 304d, respectively, as illustrated in FIG. 4b. With the chassis coupling members 204a, 204b, and 204c engaging the cover coupling members 304a, 304b, and 304c and 304d, respectively, the chassis cover 200 is coupled to the information handling system chassis 300, as illustrated in FIG. 4b, with the chassis feature 306 located adjacent the channel 206 in chassis cover 200.

The method 400 then proceeds to step 406 where the image 208 is displayed with the chassis cover 200. With the chassis cover 200 coupled to the information handling system chassis 300, the image 208 on the top surface 202e of the chassis cover 200 may be displayed wherever the information handling system chassis 300 is located. The chassis cover 200 may then be removed and replaced with chassis covers having different images, or the image on chassis cover 200 may be modified and the chassis cover re-coupled to the information handling system chassis 300. Furthermore, the chassis cover 200 may be replaced if it sustains damage. Thus, a method and apparatus are provided which allow the information handling system chassis 300 to be customized with a variety of different chassis covers 200, a chassis cover 200 which allows the modification of the chassis cover 200 by a user, and a chassis cover 200 which protects an information handling system chassis from damage. Furthermore, a method and apparatus are provided which protect the information handling system chassis 300 from scratches which can degrade the appearance of the information handling system chassis 300.

Figure 5:
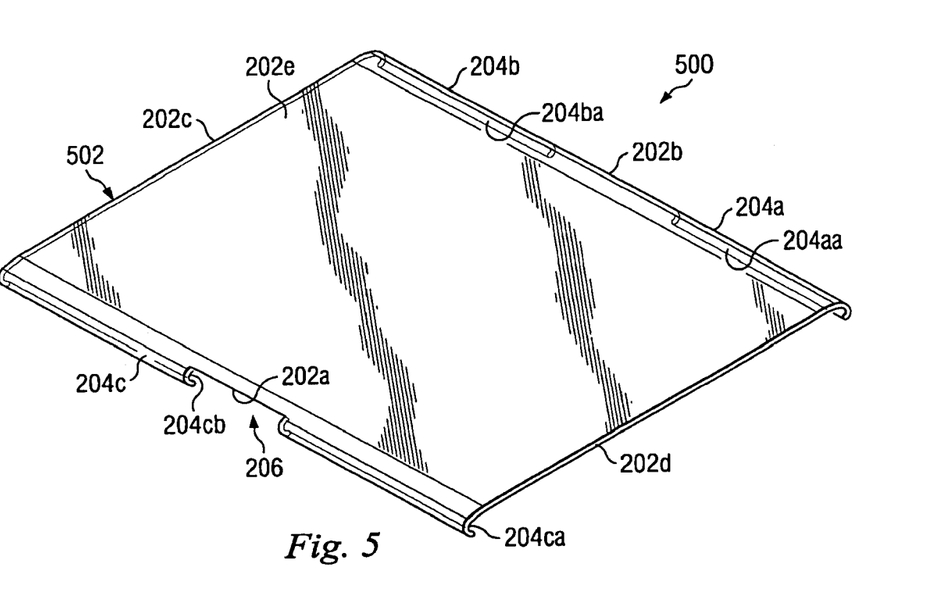
FIG. 5 is a perspective view illustrating an embodiment of a chassis cover.

Referring now to FIG. 5, in an alternative embodiment, a chassis cover 500 is substantially similar in design and operation as the chassis cover 200 described above with reference to FIGS. 2a and 2b, with the provision of a base 502 which is fabricated from a transparent material. In an embodiment, the chassis coupling members 204a, 204b, and 204c define an image between them and the side edges 202c and 202d.

Figure 6:
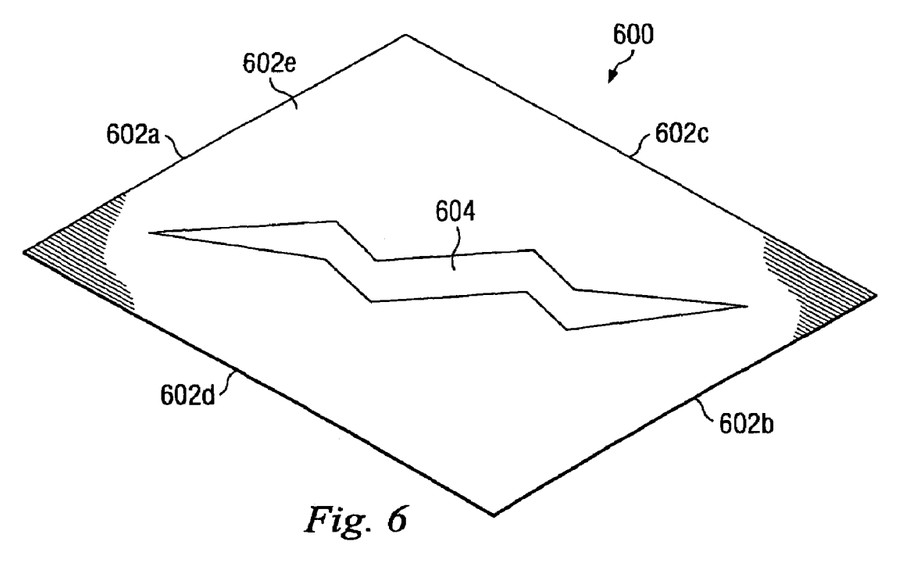
FIG. 6 is a perspective view illustrating an embodiment of an image medium used with the chassis cover of FIG. 5.

Referring now to FIG. 6, a image medium 600 is illustrated. The image medium includes a front edge 602a; a rear edge 602b located opposite the front edge 602a; a pair of substantially parallel and spaced apart side edges 602c and 602d extending between the front edge 602a and the rear edge 602b; and a top surface 602e extending between the front edge 602a, the rear edge 602b, and the side edges 602c and 602d. An image 604 is located on the top surface 602e. In an embodiment, the image medium 600 may include a conventional sheet of paper or a variety of other media known in the art for displaying printed images. In an embodiment, the image 604 may be drawn on the image medium 600. In an embodiment, the image 604 may be printed on the image medium 600 using a conventional printer known in the art.

Figure 7A:
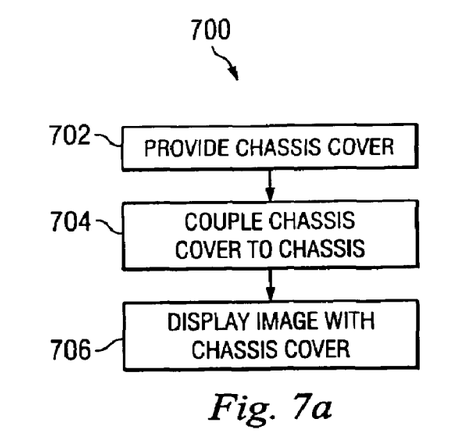
FIG. 7a is a flow chart illustrating an embodiment of a method for customizing a chassis.
Figure 7B:
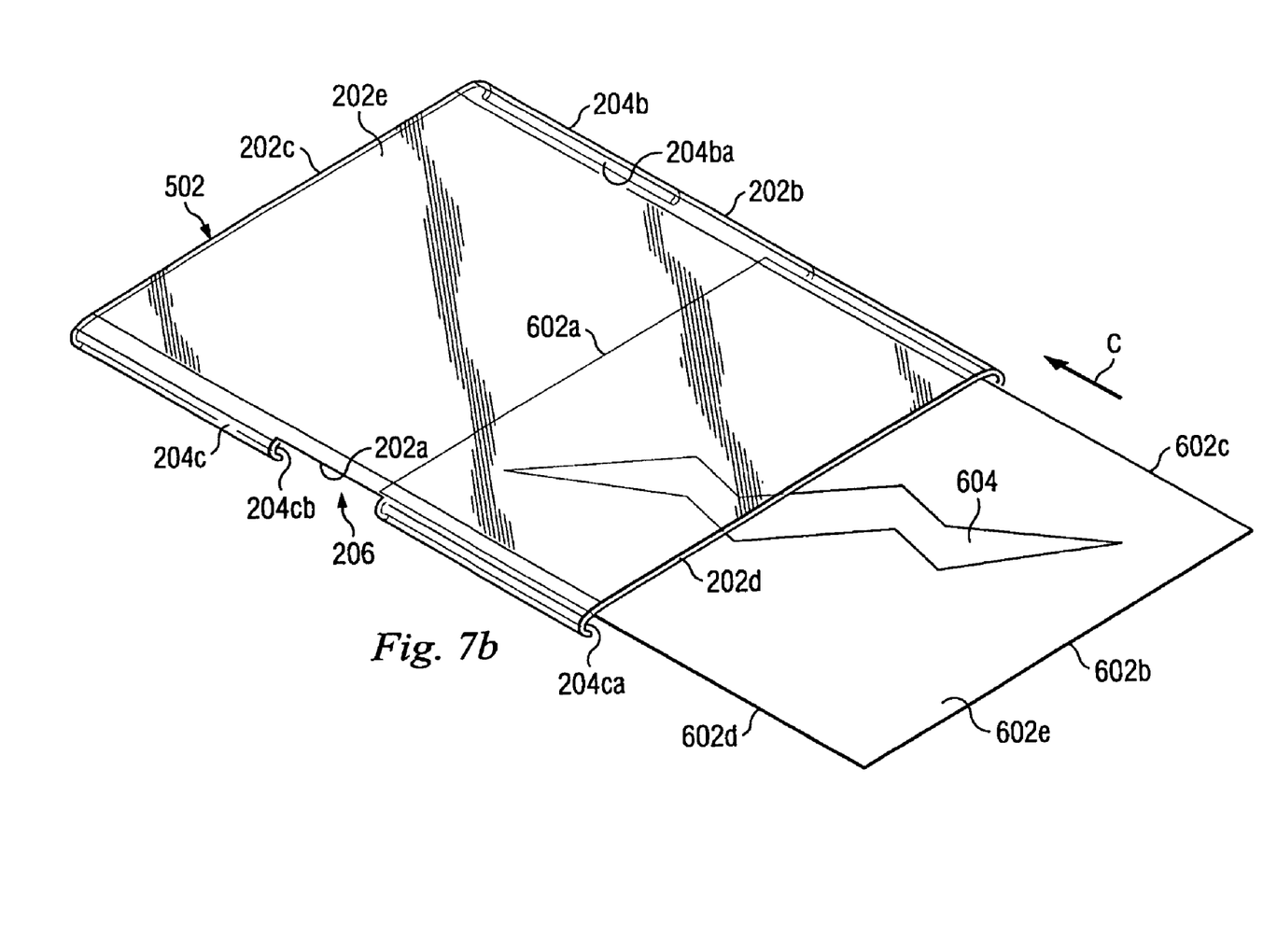
FIG. 7b is a perspective view illustrating an embodiment of the image medium of FIG. 6 being positioned adjacent the chassis cover of FIG. 5.
Figure 7C:
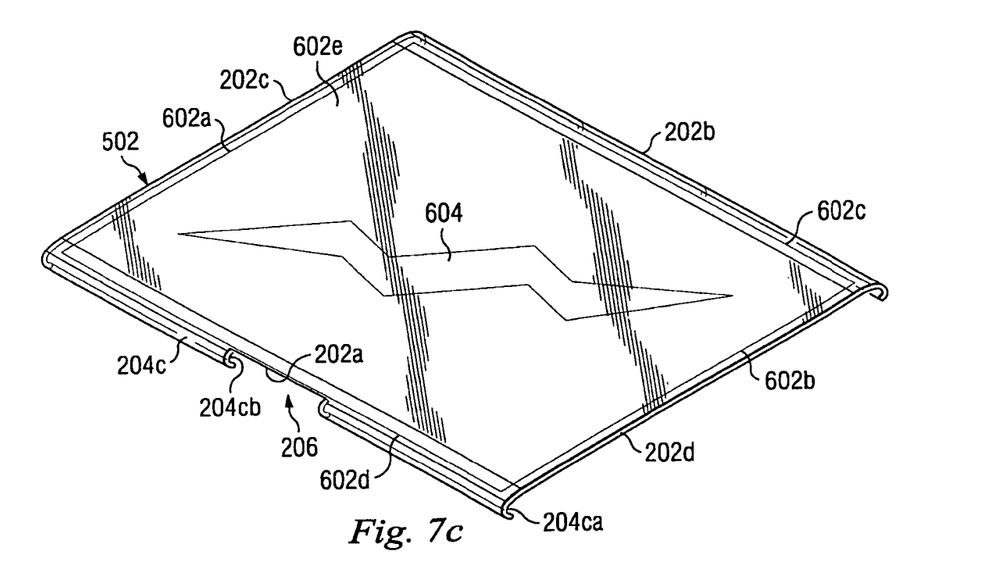
FIG. 7c is a perspective view illustrating an embodiment of the image medium of FIG. 6 positioned adjacent the chassis cover of FIG. 5.
Figure 7D:
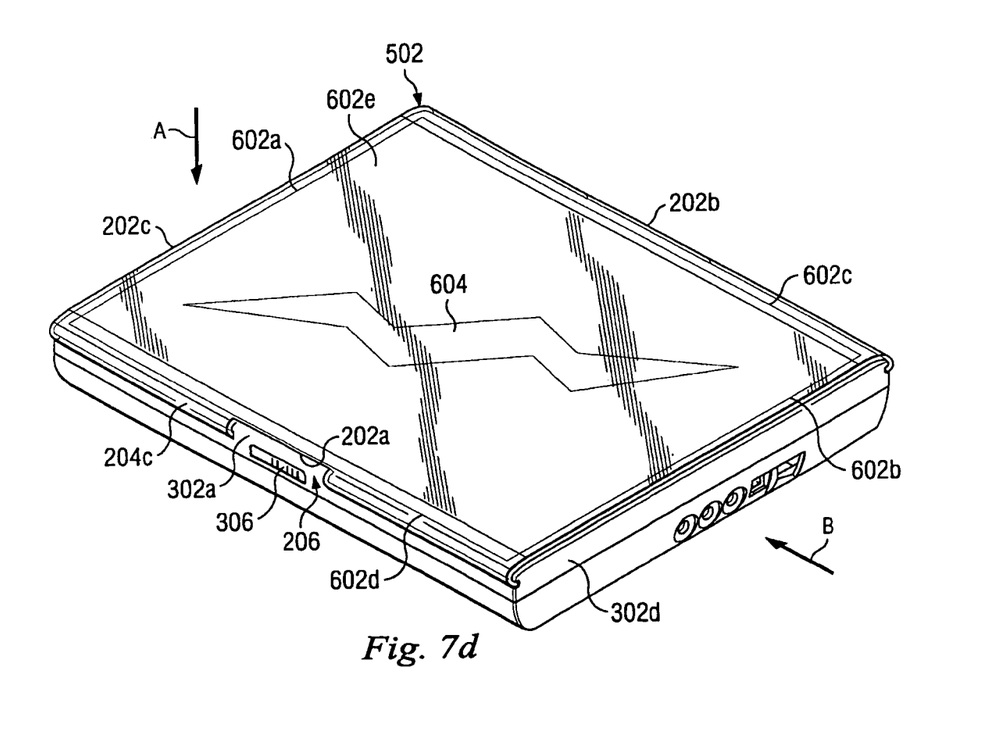

Referring now to FIGS. 7a, 7b, 7c and 7d, a method 700 for customizing a chassis is substantially similar in operation to the method 400 described above with reference to FIGS. 4a and 4b, with the provision of a modified step 702 replacing step 402. At step 702, the chassis cover 500 is provided. The image medium 600 is positioned adjacent the chassis cover 500 such that the front edge 602a of the image medium 600 is adjacent the side edge 202d of the chassis cover 500 with the side edges 602c and 602d on the image medium 600 adjacent the front edge 202a and the rear edge 202b, respectively, of the chassis cover 500. The image medium 600 is then moved in a direction C such that it enters the chassis cover 500 between the chassis coupling members 204a, 204b, and 204c, as illustrated in FIG. 7b. The image medium 600 is moved in the direction C until it is positioned between the front edge 202a, the rear edge 202b, and the side edges 202c and 202d, of chassis cover 500, as illustrated in FIG. 7c. In an embodiment, the image medium 600 may be coupled to the chassis cover 500 using, for example, an adhesive, a mechanical clip, or a variety of other coupling means known in the art. The method 700 then proceeds to step 406 where the chassis cover 500 is coupled to the chassis 300 in substantially the same manner as described above and illustrated in FIG. 7d. The method 700 then proceeds to step 404 where the image 604 is displayed with the chassis cover 500 in substantially the same manner as described above in method 400, with the provision that the image 604 is positioned between the chassis 300 and the transparent chassis cover 500 and visible through the chassis cover 500. The image medium 600 may then be replaced with image media having different images in order to allow the customization of the chassis 300 by a user. Thus, a method and apparatus are provided which allows the information handling system chassis 300 to be customized with a variety of images. Furthermore, a method and apparatus are provided which protects the information handling system chassis 300 from scratches which can degrade the appearance of the information handling system chassis 300.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A chassis customizing apparatus for coupling to an information handling system chassis comprising:
   the chassis including a visible planar surface and grooves adjacent the surface;
   a removeable chassis cover having chassis coupling members provided to engage the grooves and retain the cover on the chassis, the cover provided to reveal an image retained by the cover; and
   a channel defined by the chassis cover for allowing access to a chassis feature.

2. The apparatus of claim 1 wherein the chassis cover includes a image printed on the chassis cover.

3. The apparatus of claim 1 wherein the chassis cover includes an image coupled to the chassis cover.

4. The apparatus of claim 1 wherein the chassis cover is fabricated from a transparent material.

5. The apparatus of claim 4 further comprising:
   an image coupled to the chassis cover which is visible through the chassis cover.

6. The apparatus of claim 1 wherein the chassis cover is substantially the same dimensions as a portable information handling system chassis.

7. The apparatus of claim 1 wherein the chassis cover is coupled to an information handling system chassis.

8. An information handling system comprising:
   an information handling system chassis including a visible planar surface and grooves adjacent opposite edges of the surface;
   a removable chassis cover having chassis coupling members provided on opposite edges of the cover to engage the grooves and retain the cover, the cover provided to receive an image revealed by the cover; and
   a channel defined by the chassis cover for allowing access to a chassis feature.

9. The system of claim 8 wherein the information handling system chassis is a portable information handling system chassis.

10. The system of claim 8 wherein the information handling system chassis is a desktop information handling system chassis.

11. The system of claim 8 further comprising:
    an image coupled to the chassis cover.

12. The system of claim 11, wherein the image is positioned in the image slot between the chassis cover and the information handling system chassis and is visible through the chassis cover.

13. The system of claim 8 wherein the chassis cover protects the outer surface of the information handling system chassis from damage.

14. A method for customizing a chassis comprising:
providing a visible planar exterior surface on the chassis having grooves adjacent the surface;
providing a removable chassis cover having chassis coupling members provided to engage the grooves and retain the cover on the chassis, the cover provided to reveal an image retained by the cover; and
providing a channel defined by the chassis cover for allowing access to a chassis feature.

15. The method of claim 14 wherein the providing includes providing a chassis cover fabricated from a transparent material.

16. The method of claim 15 further comprising:
displaying an image with the chassis cover, wherein the displaying includes printing an image and positioning the printed image between the chassis cover and the outer surface of the information handling system chassis.

17. An information handling system comprising:

a portable information handling system chassis including a visible planar exterior surface and grooves adjacent opposite edges of the surface;

a removeable chassis cover having chassis coupling members provided on opposite edges of the cover to engage the grooves and retain the cover, of the cover provided to receive an image revealed by the cover; and a channel defined by the chassis cover for allowing access to a chassis feature.

\* \* \* \* \*